United States Patent [19]

Smith

[11] Patent Number: 4,563,268

[45] Date of Patent: Jan. 7, 1986

[54] METHOD OF DISCHARGING PARTICLES FROM A VIBRATING FILTER SCREEN

[75] Inventor: Gregory A. Smith, Coraopolis, Pa.

[73] Assignee: Polysar Financial Services S.A., Fribourg, Switzerland

[21] Appl. No.: 658,631

[22] Filed: Oct. 9, 1984

[51] Int. Cl.⁴ .............................................. B07B 1/28
[52] U.S. Cl. .................................... 209/257; 209/317; 209/332; 209/259; 210/388; 198/757
[58] Field of Search ............... 209/257, 259, 301, 270, 209/271, 350, 366.5, 309, 315, 317, 255, 332; 210/388; 198/756, 757

[56] References Cited

U.S. PATENT DOCUMENTS

| | | | |
|---|---|---|---|
| 2,696,302 | 12/1954 | Miller et al. | 209/332 |
| 2,845,168 | 7/1958 | Smith et al. | 198/757 |
| 3,013,663 | 12/1961 | Vane | 209/144 |
| 3,158,568 | 11/1964 | Holman | 209/332 |
| 3,429,423 | 2/1969 | Pirrollo et al. | 198/757 |
| 3,495,709 | 2/1970 | Kahane | 209/259 |
| 3,530,974 | 9/1970 | Moore | 198/757 |
| 3,655,033 | 4/1972 | Lynch et al. | 198/757 |
| 3,666,096 | 5/1972 | Riesbeck et al. | 209/259 |
| 4,000,807 | 1/1977 | Molique | 198/757 X |

OTHER PUBLICATIONS

The Encyclopedia of Chemical Process Equipment, "Screening and Grading Equipment", pp. 822 and 823.

Primary Examiner—Charles Hart
Attorney, Agent, or Firm—Stevens, Davis, Miller & Mosher

[57] ABSTRACT

Liquid dispersions may be filtered, with a minimum of stopage, to remove coagulum with a pan assembly for a circular vibratory separator comprising a hollow cylindrical frame, having therein a discharge vertically spaced from the bottom of the frame, and a helical ramp commencing substantially in the bottom plane of the frame and travelling about the interior wall of the frame in a circular direction terminating in front of and substantially in the plane of said discharge.

7 Claims, 2 Drawing Figures

METHOD OF DISCHARGING PARTICLES FROM A VIBRATING FILTER SCREEN

BACKGROUND OF THE INVENTION

Screening and grading equipment is used in the manufacture of materials which require the separation of particles by size. In the manufacture of dispersions of a small uniform particle size, it is necessary to remove clusters or aggregates from the dispersion.

One type of sifter particularly suited for separating aggregates or coagulum from solid in liquid dispersions such as lattices, or paints, is a vertical shaft offset weight sifter, also known as a circular vibratory separator. The vibro-energy separator manufactured by Sweco Inc. and sold under the Trademark SWECO is representative of this type of separator. In the separator, two eccentric weights are attached about the upper and lower ends of a rotary shaft to impart a circular vibrational movement to the screen and attached tray or pan assemblies. The motion of the separator forms a "rope" of oversized material at the outer edge of the screen which moves around the edge of the pan.

In the separation of oversized particles from a dispersion, it is important that the dispersed phase not form clusters or aggregates and that such material be removed from the pan to prevent clogging of the screen which may result in pan overflow. In filtering large amounts of dispersions, such as a latex production run, it is necessary to minimize the down time of the filter. This requires a simple, dependable continuous method for removing oversized aggregates, clusters or coagulum from the screen's surface.

The present invention is useful in the separation of oversized particles from solid in liquid dispersions such as paints, lattices and paper coating compositions. The present invention may also be used with suspensions or slurries such as industrial slurries of coal, or in the food processing industry where solids may be suspended in a fluid such as the starch slurries. In the solid in liquid dispersions which may be filtered in accordance with the present invention, the continuous fluid phase may be water, or an aqueous based solution, or it may be a hydrocarbon, used, for example, in preparing pigment dispersions.

One of the more recent developments in the screening and sizing field is the Mogensen Sizer. This sizer consists of a number of screen decks each positioned at an increasing angle and having smaller openings. The apparatus has a large capacity and is suggested as being particularly suited to screening moist or sticky materials having a very small particle size. The screen does not have a circular motion nor does it suggest that a helical ramp would be suitable for removing coagulum and oversized particles from a fluid dispersion.

Vibratory conveyors are known. In this type of equipment, material is conveyed along a pathway by vibrations imparted to the conveyor belt. This type of apparatus is usually used in association with dry material and is not primarily used in association with dispersions or slurries. This type of conveyor does not suggest an improvement in a pan assembly for a circular vibratory separator.

Vibratory bowl feeders or sizers are known. This machine transports and/or separates small dry objects such as screws or nuts by a circulatory motion. The machine does not use a screen or filter pan assembling but rather a closed bowl.

SUMMARY OF THE INVENTION

The present invention provides a pan assembly for a circular vibratory separator comprising a hollow cylindrical frame, having therein a discharge vertically spaced from the bottom of the frame, and a helical ramp commencing substantially in the bottom plane of the frame and travelling about the interior wall of the frame in the direction of circular motion of the separator and terminating in front of and substantially in the plane of said discharge.

The present invention also provides an assembly as above wherein said frame discharge and ramp are polypropylene, said ramp being about 3 inches wide with a ¾ inch lip, said frame having a height of about 20 inches and said discharge is about half way up the frame.

DESCRIPTION OF PREFERRED EMBODIMENTS

Figure 1:
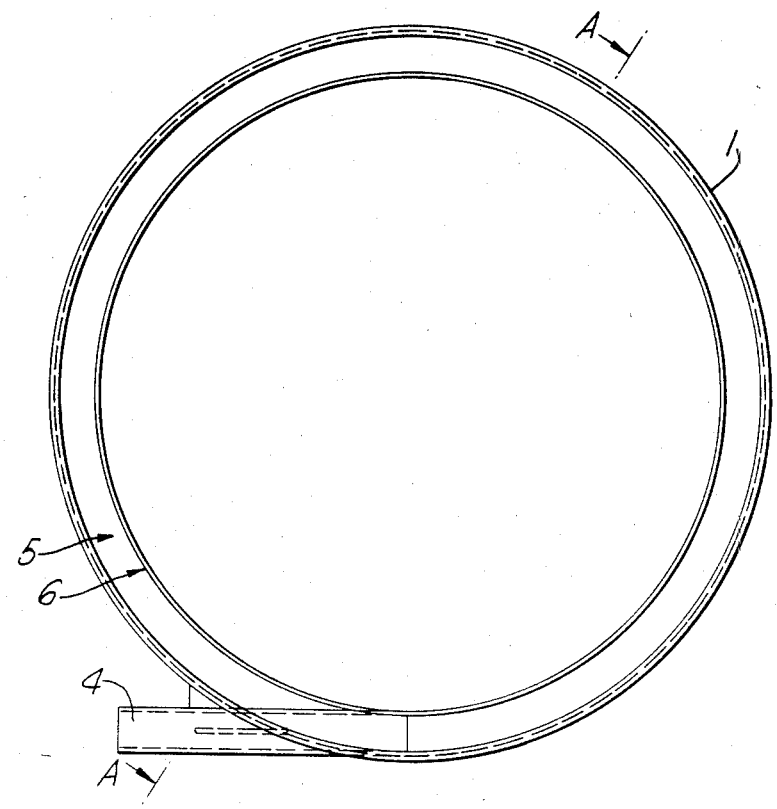
FIG. 1 is plan view of the pan assembly of one embodiment of the present invention.
Figure 2:
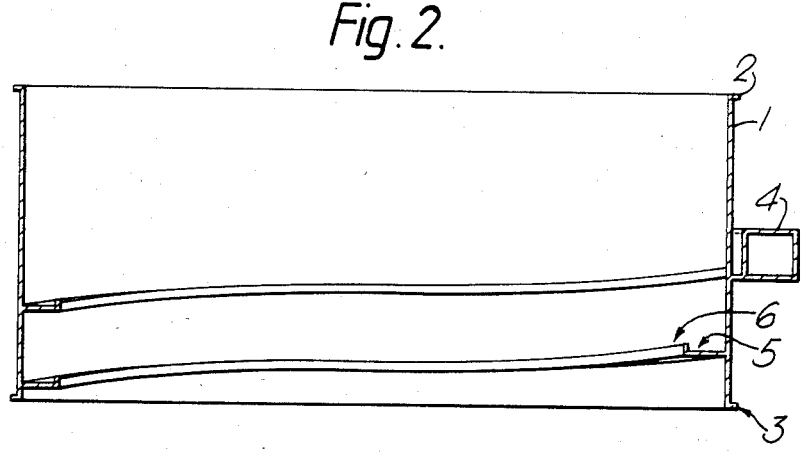
FIG. 2 is a sectional view A—A of FIG. 1.

In FIGS. 1 and 2, the same number is used to designate the same part.

The pan assembly comprises a hollow cylindrical frame 1 having an upper edge 2 and a lower edge 3. The upper and lower edges may have a lip or rim so that the pan may be fixed over the screen. Additionally, a series of pans could be joined together in a stack. The pan has a discharge 4 for oversized material. The discharge is in a plane above the bottom edge of the tray. Attached to the interior of the frame is a helical ramp 5. The ramp commences in a plane substantially in line with the bottom of the frame. The ramp extends around the interior of the frame rising to a level substantially in the plane of the discharge 4 and terminates in front of the discharge 4. If desired, the ramp may extend into or pass completely through the discharge as indicated in FIG. 1. The ramp 5 travels in the direction of circulation of material on the vibrating screen. The ramp has a lip or rim 6 on its radially interior edge.

The ramp and frame can be made of any material that is compatible with the material to be screened and strong enough to withstand the mechanical vibrations of the unit. Preferably, the frame and the ramp are made of the same or compatible material. The tray and ramp may be manufactured from any suitable material including thermoplastics. The strength imparted to the frame by the ramp enables the use of less durable materials (i.e. thermoplastics such as polyethylene, polypropylene etc.). The ramp may be attached to the interior of the frame using any suitable fixing means or the ramp and frame may be formed in one operation such as molding. In a frame of 57 inches in diameter and about 20 inches high, the ramp is about 3 inches wide with a ¾ inch vertical lip on its inside edge. The angle of the ramp will determine the efficiency of the separation. The discharge should be at a height sufficiently above the screen to minimize the likelihood of overflow. Generally the discharge is about half way up the wall of the frame.

In operation, a wet or sticky dispersion or slurry is poured into the screening apparatus. The separator's vibration moves the oversized particles to the outer edges of the screen. These particles form a 'rope' of essentially dry, oversized solids which circulate around the interior of the frame. This motion results in the rope advancing up the ramp.

The liquid dispersion does not advance up the ramp. As a result, the ramp provides a simple continuous method for removing dry oversized particles from the dispersion or slurry. This is particularly helpful in the screening of polymeric dispersions or sticky material such as paint.

The angle of the ramp is believed to be important in the present invention. If the angle is too steep, the dried particulate material will not advance up the ramp. If the angle is too low, it is believed that the dispersion per se may travel up the ramp. The ideal ramp angle will vary with the type of material being screened, the viscosity of the material being screened and the rate of vibration of the screening unit. Selection of the ideal angle for any given material will have to be determined by experiment.

It should be noted that in some circumstances the degree of rotation of the separator may be so vigorous as to cause the dispersion to splash within the frame. In extreme cases splashing can cause wetting down of material rising up the ramp. This impedes the flow of solids up the ramp. Wet material will not climb the ramp because it is not affected by the mechanical action of the screening unit the same way that dry or semi-dry solids are. Efforts must be made to reduce splashing of the liquid during operation. This can be done by modifying the feed inlet or installing suitable baffles.

The present invention has been useful in filtering lattices, particularly lattices of styrene and butadiene. The present invention should find application with other polymers and also with other solid in liquid dispersions such as clay dispersions for paper coating, or applications mentioned in the specification previously.

What is claimed is:

1. A method for continuously removing dry or semi dry sticky agglomerated oversized particles from a solid in liquid dispersion comprising passing the dispersion through a filter screen and pan assembly which is subject to circulatory and vibratory motion wherein the pan assembly comprises a hollow cylindrical frame, having therein a discharge vertically spaced from the bottom of the frame and a helical ramp commencing substantially in the bottom plane of the frame and travelling about the interior wall of the frame in a circular direction terminating in front of and substantially in the plane of said discharge collecting said oversized particles from the outer surface of said filter screen, moving said oversized particles upwardly from the bottom of the frame onto said helical ramp and discharging said oversized particles from said helical ramp onto said discharge.

2. A method according to claim 1 wherein said frame, discharge and ramp are polypropylene, said ramp being about 3 inches wide with a ¾ inch lip, said frame having a height of about 20 inches and said discharge is about half way up the frame.

3. A method according to claim 1 wherein said helical ramp has a lip on its radially inward facing edge.

4. A method according to claim 3 wherein said ramp and frame are made from a single material compatible with said solid in liquid dispersion.

5. A method according to claim 4 wherein said material is a thermoplastic material selected from the group consisting of polyethylene, polypropylene, polystyrene, and a mixture thereof.

6. A method according to claim 5 wherein said ramp rises about half of the vertical height of the frame in travelling about once around the interior of the frame.

7. A method according to claim 6 wherein said solid in liquid dispersion comprises a polymer dispersed in a liquid.

* * * * *